US012800985B2

(12) United States Patent
Kaliteevskiy et al.

(10) Patent No.: US 12,800,985 B2
(45) Date of Patent: Nov. 17, 2026

(54) LINEAR OPTICAL CONTROLLED Z-GATE COMPRISING QUANTUM MEMORIES

(71) Applicant: CORNING INCORPORATED, Corning, NY (US)

(72) Inventors: Nikolay Alekseyevich Kaliteevskiy, Espoo (FI); Fedor Dmitrievich Kiselev, Saint-Petersburg (RU); Petr Mikhaylovich Sterlingov, Espoo (FI)

(73) Assignee: CORNING INCORPORATED, Corning, NY (US)

( * ) Notice: Subject to any disclaimer, the term of this patent is extended or adjusted under 35 U.S.C. 154(b) by 338 days.

(21) Appl. No.: 18/689,121

(22) PCT Filed: Aug. 25, 2022

(86) PCT No.: PCT/US2022/041445
§ 371 (c)(1),
(2) Date: Mar. 5, 2024

(87) PCT Pub. No.: WO2023/038802
PCT Pub. Date: Mar. 16, 2023

(65) Prior Publication Data

US 2024/0280879 A1 Aug. 22, 2024

(30) Foreign Application Priority Data

Sep. 7, 2021 (RU) ................................ 2021126244

(51) Int. Cl.
*G02F 3/00* (2006.01)

(52) U.S. Cl.
CPC ..................................... *G02F 3/00* (2013.01)

(58) Field of Classification Search
CPC .......... G02F 3/00; G06N 10/40; G06N 10/20; B82Y 10/00
See application file for complete search history.

(56) References Cited

U.S. PATENT DOCUMENTS 7,126,106 B2 10/2006 Goto et al.
10,359,272 B2 * 7/2019 Mower .............. G01B 9/02049
(Continued)

FOREIGN PATENT DOCUMENTS

CN 109784493 A 5/2019

OTHER PUBLICATIONS

Barenco et al., "Elementary gates for quantum computation", Phys. Rev. A 52, 3457-3467, 1995.
(Continued)

*Primary Examiner* — Collin X Beatty
(74) *Attorney, Agent, or Firm* — Svetlana Z. Short

(57) ABSTRACT

A linear optical CZ-gate includes an A1 optical channel having an A1 input end and an A1 output end, an A2 optical channel having an A2 input end and an A2 output end, wherein a first quantum memory is optically coupled to the A2 optical channel, a B1 optical channel having a B1 input end and a B1 output end, wherein a second quantum memory is optically coupled to the B1 optical channel. The A2 optical channel and the B1 optical channel converge at a common optical channel downstream the first quantum memory and the second quantum memory, a nonlinear sign gate optically coupled to the common optical channel, and a B2 optical channel comprising a B2 input end and a B2 output end.

22 Claims, 3 Drawing Sheets

(56) References Cited

U.S. PATENT DOCUMENTS

| | | | |
|---|---|---|---|
| 11,290,192 | B2 | 3/2022 | Kaliteevskiy et al. |
| 2010/0251049 | A1 | 9/2010 | Goto et al. |
| 2017/0116542 | A1 | 4/2017 | Shim et al. |
| 2018/0322921 | A1 | 11/2018 | Brown et al. |
| 2021/0044353 | A1 | 2/2021 | Buckley et al. |
| 2023/0236846 | A1 | 7/2023 | Kaliteevskiy et al. |

OTHER PUBLICATIONS

International Search Report and Written Opinion of the International Searching Authority; PCT/US2022/041445; dated Dec. 12, 2022; 12 pages; European Patent Office.
Knill et al., "A scheme for efficient quantum computation with linear optics" Nature, vol. 409, 46-52 (2001).
Knill et al., "Efficient Linear Optics Quantum Computation," arXiv:quant-ph/0006088 (2000), 8 pages.
Kok et al; "Linear optical quantum computing"; Quantum Physics, arXiv:quant-ph/0512071; 41 pages.
Moiseev et al., "Broadband Multiresonator Quantum Memory-Interface," Scientific Reports 8:3982 (2018).
Nielsen et al., "Quantum Computation and Information", Cambridge University Press, 2000.
Sangouard et al., "Quantum Repeaters Based on Atomic Ensembles and Linear Optics"; Review of Modern Physics, vol. 83 Jan.-Mar. 2011; pp. 33-80.
Shringarpure et al., "Destructive Controlled Phase Gate using Linear Optics," Physics Department, University of Maryland Baltimore County, Baltimore MD, 2001, 8 pages.
Williamson et al., "Magneto-Optic Modulator with Unit Quantum Efficiency," Phys. Rev. Lett. 113, 203601, Nov. 14, 2014.

* cited by examiner

LINEAR OPTICAL CONTROLLED Z-GATE COMPRISING QUANTUM MEMORIES

CROSS REFERENCE TO RELATED APPLICATIONS

This application claims the benefit of priority under 35 U.S.C. § 371 of International Application No. PCT/US2022/041445, filed on Aug. 25, 2022, which claims the benefit of priority under 35 U.S.C. § 119 of Russian Patent Application Serial No. 2021126244, filed on Sep. 7, 2021, the content of which is relied upon and incorporated herein in its entirety.

BACKGROUND

Field

The present specification generally relates to a quantum computing logic gates. More specifically, the present disclosure relates to a linear optical controlled Z-gate that includes quantum memories.

Technical Background

Linear optical quantum computing is a physical implementation of a universal quantum computer that uses quantum logic gates and qubits. Currently, unitary operations can be performed on dual-rail encoded photons using beamsplitters and phase shifters. The simplicity of the optical elements and the low decoherence make linear optical implementations more attractive than superconductive implementations for quantum computing.

Accordingly, a need exists for improved quantum computing systems, such as improved quantum logic gates, for use in linear optical quantum computing.

SUMMARY

According to a first aspect of the present disclosure, a linear optical CZ-gate includes an A1 optical channel having an A1 input end and an A1 output end, an A2 optical channel having an A2 input end and an A2 output end, wherein a first quantum memory is optically coupled to the A2 optical channel, a B1 optical channel having a B1 input end and a B1 output end, wherein a second quantum memory is optically coupled to the B1 optical channel. The A2 optical channel and the B1 optical channel converge at a common optical channel downstream the first quantum memory and the second quantum memory, a nonlinear sign gate optically coupled to the common optical channel, and a B2 optical channel comprising a B2 input end and a B2 output end.

A second aspect of the present disclosure includes the linear optical CZ-gate of the first aspect, wherein the A2 optical channel and the B1 optical channel diverge from the common optical channel downstream the nonlinear sign gate.

A third aspect of the present disclosure includes the linear optical CZ-gate of the first aspect or the second aspect, further including a first optical switch optically coupled to the A2 optical channel and the B1 optical channel between the first and second quantum memories and the common optical channel and a second optical switch optically coupled to the A2 optical channel and the B1 optical channel between the common optical channel and the A2 output end and between the common optical channel and the B1 output end.

A fourth aspect of the present disclosure includes the linear optical CZ-gate of the third aspect, wherein the A2 optical channel includes a first A2 channel arm extending from the A2 input end to the first optical switch and a second A2 channel arm extending the from the second optical switch to the A2 output end and the B1 optical channel includes a first B1 channel arm extending from the B1 input end to the first optical switch and a second B1 channel arm extending the from the second optical switch to the B1 output end.

A fifth aspect of the present disclosure includes the linear optical CZ-gate of any of the first through fourth aspects, further including a first optical coupler optically coupled to the A2 optical channel and the B1 optical channel at a location between the A2 input end and the first quantum memory and between the B1 input end and the second quantum memory and a second optical coupler optically coupled to the A2 optical channel and the B1 optical channel at a location between the nonlinear sign gate and the A2 output end and between the nonlinear sign gate and the B1 output end.

A sixth aspect of the present disclosure includes the linear optical CZ-gate of any of the first through fifth aspects, further including a third quantum memory optically coupled to the A2 optical channel between the nonlinear sign gate and the A2 output end, a fourth quantum memory optically coupled to the B1 optical channel between the nonlinear sign gate and the B1 output end, a fifth quantum memory optically coupled to the A1 optical channel between the A1 input end and the A1 output end, and a sixth quantum memory optically coupled to the B2 optical channel between the B2 input end and the B2 output end.

A seventh aspect of the present disclosure includes the linear optical CZ-gate of any of the first through sixth aspects, wherein the first quantum memory is configured to absorb a photon representing a quantum state and release a photon having the quantum state of the received photon toward the nonlinear sign gate.

An eighth aspect of the present disclosure includes the linear optical CZ-gate of any of the first through seventh aspects, wherein the nonlinear sign gate includes a first ancilla channel having a first input end optically coupled to an ancilla photon source and a first output end optically coupled to a first photon detector, a second ancilla channel having a second input end and a second output end, wherein the second output end is optically coupled to a second photon detector, and a central optical coupler optically coupled to the first ancilla channel and the common optical channel between the ancilla photon source and the first photon detector.

A ninth aspect of the present disclosure includes the linear optical CZ-gate of the eighth aspect, wherein the nonlinear sign gate further includes a first ancilla optical coupler optically coupled to the first ancilla channel and the second ancilla channel between the ancilla photon source and the central optical coupler and a second ancilla optical coupler optically coupled to the first ancilla channel and the second ancilla channel between the central optical coupler and the second photon detector.

A tenth aspect of the present disclosure includes the linear optical CZ-gate of the eighth aspect or the ninth aspect, wherein the ancilla photon source includes a single photon source and the first photon detector and the second photon detector each includes a single photon detector.

An eleventh aspect of the present disclosure includes the linear optical CZ-gate of any of the first through tenth aspects, wherein the nonlinear sign gate is the one and only one nonlinear sign gate in the linear optical CZ-gate.

According to twelfth aspect of the present disclosure, a method of operating a linear optical CZ-gate includes absorbing, using a first quantum memory of the linear optical CZ-gate, a first quantum state received by the first quantum memory, the linear optical CZ-gate further including an A1 optical channel comprising an A1 input end and an A1 output end, an A2 optical channel comprising an A2 input end and an A2 output end, wherein the first quantum memory is optically coupled to the A2 optical channel, a B1 optical channel comprising a B1 input end and a B1 output end, wherein a second quantum memory is optically coupled to the B1 optical channel, wherein the A2 optical channel and the B1 optical channel converge at a common optical channel downstream the first quantum memory and the second quantum memory, a nonlinear sign gate optically coupled to the common optical channel, and a B2 optical channel comprising a B2 input end and a B2 output end. The method also includes absorbing, using the second quantum memory, a second quantum state received by the second quantum memory, releasing the first quantum state from the first quantum memory into the nonlinear sign gate, performing a sign flip function in the nonlinear sign gate using the first quantum state, releasing the second quantum state from the second quantum memory into the nonlinear sign gate, and performing the sign flip function in the nonlinear sign gate using the second quantum state.

A thirteenth aspect of the present disclosure includes the method of the twelfth aspect, further including directing an A1 quantum state into the A1 input end of the A1 optical channel, directing an A2 quantum state into the A2 input end of the A2 optical channel, wherein the A1 and A2 quantum states define a first logical qubit, directing a B1 quantum state into the B1 input end of the B1 optical channel, and directing a B2 quantum state into the B2 input end of the B2 optical channel, wherein the B1 and B2 quantum states define a second logical qubit, wherein a first optical coupler is optically coupled to the A2 optical channel and the B1 optical channel at a location between the A2 input end and the first quantum memory and between the B1 input end and the second quantum memory, a second optical coupler is optically coupled to the A2 optical channel and the B1 optical channel at a location between the nonlinear sign gate and the A2 output end and between the nonlinear sign gate and the B1 output end, the first quantum state is one of the A1-B2 quantum states, and the second quantum state is one of the A1-B2 quantum states.

A fourteenth aspect of the present disclosure includes the method of the thirteenth aspect, wherein when the A1 quantum state comprises a single photon and the A2 quantum state comprises zero photons, the first logical qubit is in a 0-state, when the A1 quantum state comprise zero photons and the A2 quantum state comprises a single photon, the first logical qubit is in a 1-state, when the B1 quantum state comprise a single photon and the B2 quantum state comprises zero photons, the second logical qubit is in a 1-state, and when the B1 quantum state comprise zero photons and the B2 quantum state comprises a single photon, the second logical qubit is in a 0-state.

A fifteenth aspect of the present disclosure includes the method of any of the twelfth through the fourteenth aspects, wherein performing the sign flip function on the first quantum state includes directing an ancilla photon from an ancilla photon source of the nonlinear sign gate into a first input end of a first ancilla channel of the nonlinear sign gate. The nonlinear sign gate includes a first photon detector optically coupled to a first output end of the first ancilla channel, a second ancilla channel comprising a second input end and a second output end, a second photon detector optically coupled to the second output end, a central optical coupler optically coupled to the first ancilla channel and the common optical channel between the ancilla photon source and the first photon detector, a first ancilla optical coupler optically coupled to the first ancilla channel and the second ancilla channel between the ancilla photon source and the central optical coupler, and a second ancilla optical coupler optically coupled to the first ancilla channel and the second ancilla channel between the central optical coupler and the second photon detector. The method further includes receiving the first quantum state at the central optical coupler, detecting a single photon at the first photon detector, and detecting zero photons at the second photon detector.

A sixteenth aspect of the present disclosure includes the method of any of the twelfth through the fifteenth aspects, wherein the first quantum state is directed from the first quantum memory into a first optical switch optically coupled to the A2 optical channel and the B1 optical channel between the first and second quantum memories and the common optical channel, the first optical switch is in a first position optically coupling the A2 optical channel and the common optical channel such that the first quantum state reaches the nonlinear sign gate and undergoes the sign flip function and the method further includes changing the first optical switch from the first position to a second position in which the B1 optical channel is optically coupled to the common optical channel, such that the second quantum state is directed from the second quantum memory into the first optical switch and thereafter into the nonlinear sign gate where the second quantum state undergoes the sign flip function.

A seventeenth aspect of the present disclosure includes the method of the sixteenth aspect, wherein after performing the sign flip function in the nonlinear sign gate using the first quantum state, the method further includes directing a first post-gate quantum state from the nonlinear sign gate, through a second optical switch that is in a first position, and into a third quantum memory, where the first post-gate quantum state is absorbed and after performing the sign flip function in the nonlinear sign gate using the second quantum state, the method further comprises directing a second post-gate quantum state from the nonlinear sign gate, through the second optical switch that is in a second position, and into a fourth quantum memory, where the second post-gate quantum state is absorbed.

An eighteenth aspect of the present disclosure includes the method of the seventeenth aspect, wherein a fifth quantum memory is optically coupled to the A1 optical channel, a sixth quantum memory is optically coupled to the B2 optical channel, and the method further includes absorbing a quantum state traversing the A1 optical channel with the fifth quantum memory, absorbing a quantum state traversing the B2 optical channel with the sixth quantum memory, and releasing quantum state from each of the third quantum memory, the fourth quantum memory, the fifth quantum memory, and the sixth quantum memory, synchronously, such that the quantum states reach each of the A1 output end, the A2 output end, the B1 output end, and the B2 output end simultaneously.

According to a nineteenth aspect of the present disclosure, a linear optical CZ-gate includes an A1 optical channel comprising an A1 input end and an A1 output end, an A2 optical channel comprising an A2 input end and an A2 output end, wherein the A2 optical channel includes a first A2 channel arm extending from the A2 input end to a first optical switch and a second A2 channel arm extending the from a second optical switch to the A2 output end and a first quantum memory is optically coupled to the first A2 channel arm, a B1 optical channel including a B1 input end and a B1 output end. The B1 optical channel includes a first B1 channel arm extending from the B1 input end to the first optical switch and a second B1 channel arm extending the from the second optical switch to the B1 output end, a second quantum memory is optically coupled to the first B1 channel arm, and a first optical coupler optically coupled to the first A2 channel arm and the first B1 channel arm upstream the first and second quantum memories. A common optical channel extends from the first optical switch to the second optical switch, a nonlinear sign gate is optically coupled to the common optical channel and a B2 optical channel comprising a B2 input end and a B2 output end.

A twentieth aspect of the present disclosure includes the linear optical CZ-gate includes a third quantum memory optically coupled to the A2 optical channel between the nonlinear sign gate and the A2 output end, a fourth quantum memory optically coupled to the B1 optical channel between the nonlinear sign gate and the B1 output end, a fifth quantum memory optically coupled to the A1 optical channel between the A1 input end and the A1 output end, and a sixth quantum memory optically coupled to the B2 optical channel between the B2 input end and the B2 output end.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
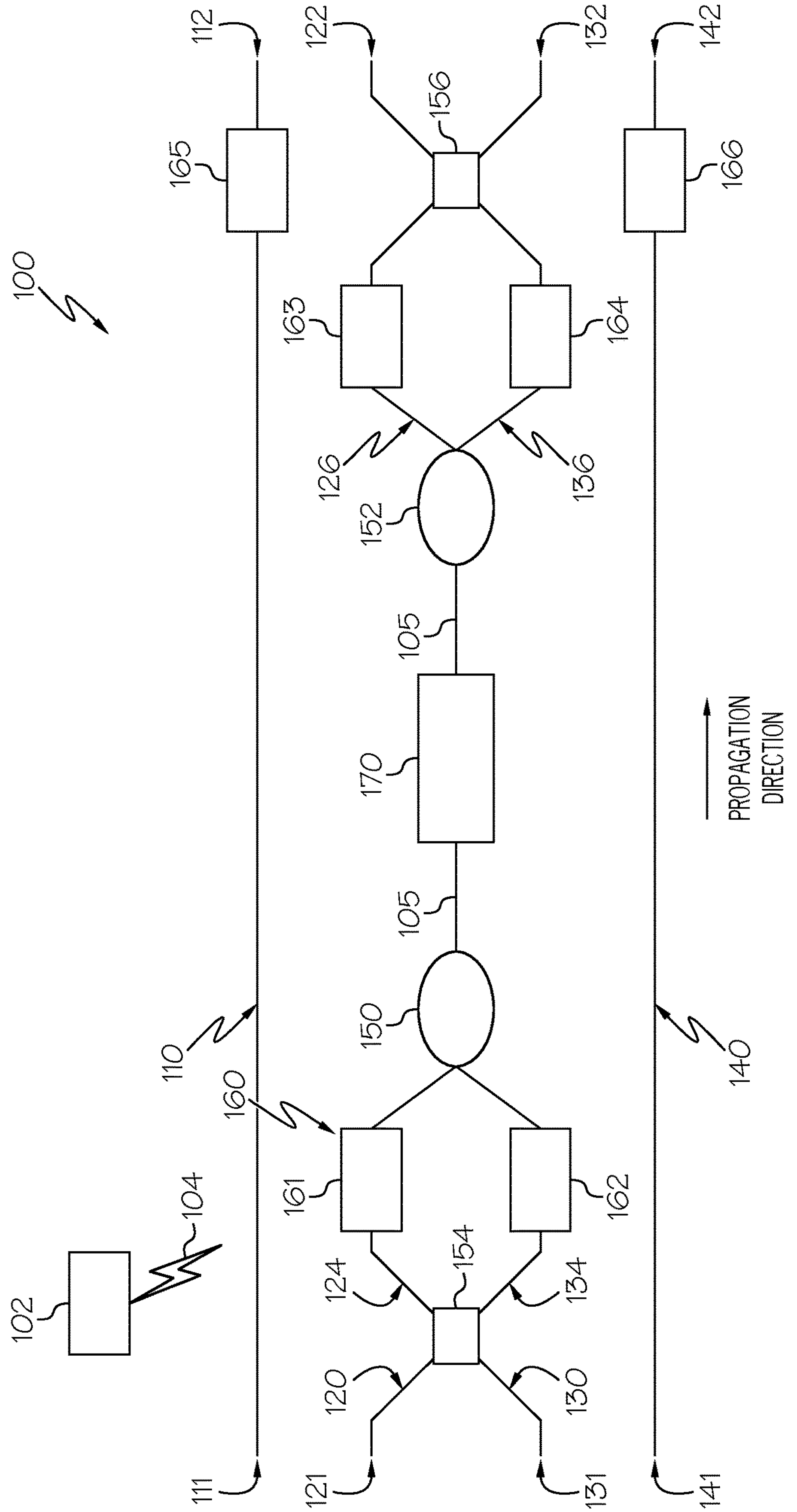
FIG. 1 schematically depicts a linear optical CZ-gate comprising quantum memories and a single nonlinear sign gate, according to one or more embodiments shown and described herein.

Reference will now be made in detail to embodiments of a linear optical controlled Z (CZ) gate, embodiments of which are illustrated in the accompanying drawings. Traditional optical CZ-gates include four optical channels and two nonlinear sign gates. One example linear optical CZ-gate, referred to as the KLM protocol, is described in E. Knill, R. Laflamme, G. Milburn, "Efficient Linear Optics Quantum Computation," arXiv:quant-ph/0006088 (2000), which discusses linear optical CZ-gate based on beamsplitters, phase shifters and a teleportation protocol for the creation of near-deterministic many-qubit transformations. However, the KLM protocol requires a large number of linear optical elements to form CZ gates, which creates scalability, qubit synchronization, and error rate problems. For example, traditional optical CZ gates of the KLM protocol use two non-linear sign gates. In the embodiments described herein, improved linear optical CZ gates are described which incorporate quantum memories to temporally space quantum states propagating through the linear optical CZ-gate, improving qubit synchronization, and facilitating the use of a single nonlinear sign gate. Using a single nonlinear sign gate reduces the number of optical components in the linear optical CZ-gate and provides fail-fast functionality in which operation of the linear optical CZ-gate may be restarted after confirmation of a first failed sign-gate operation (e.g., failed sign flip function). Whenever possible, the same reference numerals will be used throughout the drawings to refer to the same or like parts.

Referring now to FIG. 1, a linear optical CZ-gate 100 is schematically depicted. The linear optical CZ-gate 100 includes four optical channels, an A1 optical channel 110 comprising an A1 input end 111 and an A1 output end 112, an A2 optical channel 120 comprising an A2 input end 121 and an A2 output end 122, a B1 optical channel 130 comprising a B1 input end 131 and a B1 output end 132, and a B2 optical channel 140 comprising a B2 input end 141 and a B2 output end 142. The linear optical CZ-gate 100 includes multiple quantum memories 160 for storing quantum states of qubits propagating in the linear optical CZ-gate 100. A first quantum memory 161 is optically coupled to the A2 optical channel 120 and a second quantum memory 162 is optically coupled to the B1 optical channel 130. The A2 optical channel 120 and the B1 optical channel 130 converge at a common optical channel 105 downstream the first quantum memory 161 and the second quantum memory 162. Furthermore, a nonlinear sign gate 170 is optically coupled to the common optical channel 105. Thus, the first quantum memory 161 and the second quantum memory 162 are positioned between the A1-B2 input ends 111, 121, 131, 141 and the nonlinear sign gate 170. In operation, the first quantum memory 161 and the second quantum memory 162 temporarily store quantum states of qubits while the qubits are propagating through the linear optical CZ-gate 100. Including multiple quantum memories 160 allows the use of a single nonlinear sign gate 170, compared to two nonlinear sign gates in traditional optical CZ gates.

As used herein, "optically coupled" refers to two or more components arranged such that photons pulses and/or quantum states may be transferred therebetween. For example, optical channels may optically couple the components of the linear optical CZ-gate 100. The optical channels may comprise free space, free space in combination with collection optics such as lenses or the like, and/or optical waveguides such as an optical fiber comprising a core and a cladding surrounding the core, a planar waveguide, or the like.

The linear optical CZ-gate 100 may further comprises additional quantum memories 160, such as a third quantum memory 163, a fourth quantum memory 164, a fifth quantum memory 165, and a sixth quantum memory 166. The third quantum memory 163 is optically coupled to the A2 optical channel 120 between the nonlinear sign gate 170 and the A2 output end 122. The fourth quantum memory 164 is optically coupled to the B1 optical channel 130 between the nonlinear sign gate 170 and the B1 output end 132. The fifth quantum memory 165 is optically coupled to the A1 optical channel 110 between the A1 input end 111 and the A1 output end 112. The sixth quantum memory 166 is optically coupled to the B2 optical channel 140 between the B2 input end 141 and the B2 output end 142. The inclusion of the third-sixth quantum memories 163-166 facilitates synchronous arrival of quantum states at the output ends 112, 122, 132, 142 of the A1-B2 optical channels 110-140.

As shown in FIG. 1, the linear optical CZ-gate 100 further comprises a first optical switch 150 and a second optical switch 152. The first optical switch 150 is optically coupled to the A2 optical channel 120 and the B1 optical channel 130 between the first and second quantum memories 161, 162 and the common optical channel 105. The second optical switch 152 is optically coupled to the A2 optical channel 120 and the B1 optical channel 130 between the common optical channel 105 and the A2 output end 122 and between the common optical channel 105 and the B1 output end 132. The A2 optical channel 120 includes a first A2 channel arm 124 and a second A2 channel arm 126. Similarly, the B1 optical channel a first B1 channel arm 134 and a second B1 channel arm 136. The first A2 channel arm 124 extends from the A2 input end 121 to the first optical switch 150 and the second A2 channel arm 126 extends the from the second optical switch 152 to the A2 output end 122. The first B1 channel arm 134 extends from the B1 input end 131 to the first optical switch 150 and the second B1 channel arm 136 extends from the second optical switch 152 to the B1 output end 132. The common optical channel 105 and the nonlinear sign gate 170 are positioned between the first A2 and B1 channel arms 124, 134 and the second A2 and B1 channel arms 126, 136. The first A2 channel arm 124 and the first B1 channel arm 134 converge upstream the nonlinear sign gate 170 to form the common optical channel 105. Further, the A2 optical channel 120 and the B1 optical channel 130 diverge from the common optical channel 105 downstream the nonlinear sign gate 170, forming the second A2 and B1 channel arms 126, 136.

In operation, the first optical switch 150 may be in a first position or a second position and may be moved from the first portion to the second position and vice versa in response to control signals received from a controller 102. Similarly, the second optical switch 152 may be in a first position or a second position and may be moved from the first portion to the second position and vice versa in response to control signals received from the controller 102. When the first optical switch 150 is in the first position, the A2 optical channel 120, specifically the first A2 channel arm 124, and the common optical channel 105 are optically coupled, such that quantum states released by the first quantum memory 161 may reach the nonlinear sign gate 170. When the first optical switch 150 is in the second position, the B1 optical channel 130, specifically the first B1 channel arm 134, and the common optical channel 105 are optically coupled, such that quantum states released by the second quantum memory 162 may reach the nonlinear sign gate 170. When the second optical switch 152 is in the first position, the A2 optical channel 120, specifically the second A2 channel arm 126, and the common optical channel 105 are optically coupled, such that quantum states output by the nonlinear sign gate 170 reach the third quantum memory 163. When the second optical switch 152 is in the second position, the B1 optical channel 130, specifically the second B2 channel arm 136, and the common optical channel 105 are optically coupled, such that quantum states output by the nonlinear sign gate 170 reach the fourth quantum memory 164.

The linear optical CZ-gate 100 further comprises a first optical coupler 154 and a second optical coupler 156. The first optical coupler 154 is optically coupled to the A2 optical channel 120 and the B1 optical channel 130 at a location between the A2 input end 121 and the first quantum memory 161 and between the B1 input end 121 and the second quantum memory 162. The second optical coupler 156 is optically coupled to the A2 optical channel 120 and the B1 optical channel 130 at a location between the nonlinear sign gate 170 and the A2 output end 122 and between the nonlinear sign gate 170 and the B1 output end 132. At the first optical coupler 154 and the second optical coupler 156 quantum states may transfer from the A2 optical channel 120 to the B1 optical channel 130 and vice versa. For example, a photon propagating in the A2 optical channel 120 representing a 1-state of the A logical qubit may propagate from the A2 optical channel 120 into the B1 optical channel 130 at the first optical coupler 154.

In some embodiments, the first optical coupler 154 and the second optical coupler 156 comprise a 50:50 coupling ratio such that the first and second optical couplers 154, 156 direct 50% of photons that enter the first and second optical couplers 154, 156 into the A2 optical channel 120 and 50% of the photons that enter the first and second optical couplers 154, 156 into the B1 optical channel 130. However, it should be understood that the first and second optical couplers 154, 156 may comprise other coupling ratios, for example, a range of coupling ratios of from 10:90 to 90:10, such as 20:80, 25:75, 40:60, 45:55, 50:50, 55:45, 60:40, 75:25, 80:20, or the like. In some embodiments, the first and second optical couplers 154, 156 may comprise beamsplitters, such as 50:50 beam splitters. In other embodiments, the first and second optical couplers 154, 156 may comprise, for example, directional couplers, multi-mode interferometers, stimulated Raman adiabatic passage (STIRAP) couplers, semitransparent mirrors, or other optical couplers known in the art.

The linear optical CZ-gate 100 may be part of a quantum computing system that further comprises a controller 102 communicatively coupled to the linear optical CZ-gate 100 using a communication path 104 that provides signal interconnectivity between the controller 102 and various components of the linear optical CZ-gate 100. As used herein, the term "communicatively coupled" means that coupled components are capable of exchanging data signals with one another such as, for example, electrical signals via conductive medium, electromagnetic signals via air, optical signals via optical waveguides, and the like. In operation, the controller 102 provides control signals to each of the first optical switch 150, the second optical switch 152 and the quantum memories 160. Control signals from the controller 102 may set (i.e., alter or retain) a position of the first and second optical switches 150, 152. The controller 102 may send control signals to the quantum memory 160 to time the release of quantum states. In some embodiments, the linear optical CZ-gate 100 may be implemented as an integrated photonic device, such as an "on chip" device. Some or all components of the linear optical CZ-gate 100 may be embedded into a planar waveguide or may be a portion of the planar waveguide (e.g., laser written waveguides). In other embodiments, the linear optical CZ-gate 100 may comprise bulk optics.

The linear optical CZ-gate 100 is a logic gate that may be used in a quantum computer that uses dual-rail qubit encoding. Without intending to be limited by theory, the quantum state of a qubit depends on the superposition of a photon being in two optical modes, which may be spatial, polarization or temporal. The linear optical CZ-gate 100 described herein uses spatial optical modes thus uses two optical channels to represent each of the two qubits propagating the linear optical CZ-gate 100. That is, a first logical qubit A is coded in the A1 optical channel 110 and the A2 optical channel 120 of the linear optical CZ-gate 100 as an A1 quantum state and an A2 quantum state. The A1 quantum state may be either a single photon or a null state (i.e., zero photons) and the A2 quantum state may be either a single photon or a null state (i.e., zero photons). When the A1 quantum state comprises a single photon and the A2 quantum state comprises zero photons, the first logical qubit A is in a 0-state. When the A1 quantum state comprises zero photons and the A2 quantum state comprises a single photon, the first logical qubit A is in a 1-state. Put mathematically, the first qubit A is coded in the optical channel A1 and the optical channel A2 according to Equation (1) and Equation (2), below.

$$|0>_a = |1>_{a1} \otimes |0>_{a2} \quad (1)$$

$$|1>_a = |0>_{a1} \otimes |1>_{a2} \quad (2)$$

A second logical qubit B is coded in the B1 optical channel 130 and the B2 optical channel 140 as a B1 quantum state and a B2 quantum state. The B1 quantum state may be either a single photon or a null state (i.e., zero photons) and the B2 quantum state may be either a single photon or a null state (i.e., zero photons). When the B1 quantum state comprises a single photon and the B2 quantum state comprises zero photons, the second logical qubit is in a 1-state. When the B1 quantum state comprise zero photons and the B2 quantum state comprises a single photon, the second logical qubit is in a 0-state. Put mathematically, the second qubit B is coded in the optical channel B1 and the optical channel B2 according to Equation (3) and Equation (4), below.

$$|0>_b = |0>_{b1} \otimes |1>_{b2} \quad (3)$$

$$|1>_b = |1>_{b1} \otimes |0>_{b2} \quad (4)$$

Each quantum memory 160 is structurally configured to store and release the quantum states of qubits. For example, when the quantum state received by the quantum memory 160 is a 1-state, the quantum state is represented by a photon, the photon may be stored, for example, absorbed via a non-linear optical process. When the quantum state received by the quantum memory 160 is 0-state, the quantum state is represented by zero photons (i.e., a null state). The quantum memory 160 stores this null state by inaction and thus the temporal and spatial location of the 0-state is controlled and the 0-state retains coordination with its corresponding 1-state. While not intending to be limited by theory, each quantum memory 160 is structurally configured to, upon receipt of a photon pulse (e.g., a photon pulse representing a 1-state of a qubit), absorb a photon via a non-linear optical process thereby exciting an atomic ensemble state of the quantum memory 160 from a first energy state, such as a ground state, into a second energy state, such as a non-ground state, for example, an excited state. As used herein, "atomic ensemble state" refers to the arrangement of energy states of the atoms that comprise the quantum memory 160. As a non-limiting example, in the first energy state, the electrons of the quantum memory 160 may be in a ground state and in the second energy state, some of those electrons may move into an excited state. In some embodiments, the first energy state may have a lower total energy than the second energy state. While still not intending to be limited by theory, the atomic ensemble state of each quantum memory 160 may return to the first energy state after a period of time, without an outside stimulus, or upon receipt of an outside stimulus, such as a control signal received from the controller 102. Upon return to the first energy state, a photon is released.

Each quantum memory 160 may comprise any known or yet to be developed quantum memory, such as an atomic assembly in which individual quantum states may be absorbed in such a manner that the quantum state of the received qubit is preserved by the atomic ensemble and can be released as a released photon or null state that shares quantum states with the corresponding received photon or null state. For example, the released photon may be released upon request (e.g., upon receipt of a control signal of the controller 102) or after a set delay. Further, when a null state is released, the null state (i.e., a 0-state) retains temporal and spatial coordination with the corresponding 1-state of its qubit.

Some example quantum memories are described in Sangouard et al., "Quantum Repeaters Based on Atomic Ensembles and Linear Optics"; Review of Modern Physics, vol. 83 January-March 2011; pp. 33-80, in which quantum memories are used in quantum repeaters to enable entanglement swapping. Other example quantum memories include the quantum memory systems described in U.S. Pat. Pub. No. 2018/0322921 titled "Quantum Memory Systems and Quantum Repeater Systems Comprising Doped Polycrystalline Ceramic Optical Devices and Methods of Manufacturing the Same," assigned to Corning Incorporated of Corning, New York. Other example quantum memories may be realized in microwave or radio frequencies (RF), where an electromagnetic field of photons is used as an elemental carrier of information along waveguides (e.g., metallic, superconducting waveguides). An example of this approach is described in Moiseev et al., "Broadband Multiresonator Quantum Memory-Interface," Scientific Reports 8:3982 (2018). Other example quantum memories may be realized using microresonators for photons in optical and/or telecommunication wavelength ranges. Furthermore, there example quantum memories may covert optical photons to microwave photons and back. An example of this approach is described in Williamson et al., "Magneto-Optic Modulator with Unit Quantum Efficiency," Phys. Rev. Lett. 113, 203601, Nov. 14, 2014.

As the first quantum memory 161 and the second quantum memory 162 store quantum states, the quantum states of qubits traversing the A2 optical channel 120 and the B1 optical channel 130 may be temporally spaced, allowing the A2 optical channel 120 and the B1 optical channel 130 converge at the common optical channel 105 downstream the first quantum memory 161 and the second quantum memory 162, and allowing the linear optical CZ-gate 100 to comprise a single nonlinear sign gate 170.

Figure 2:
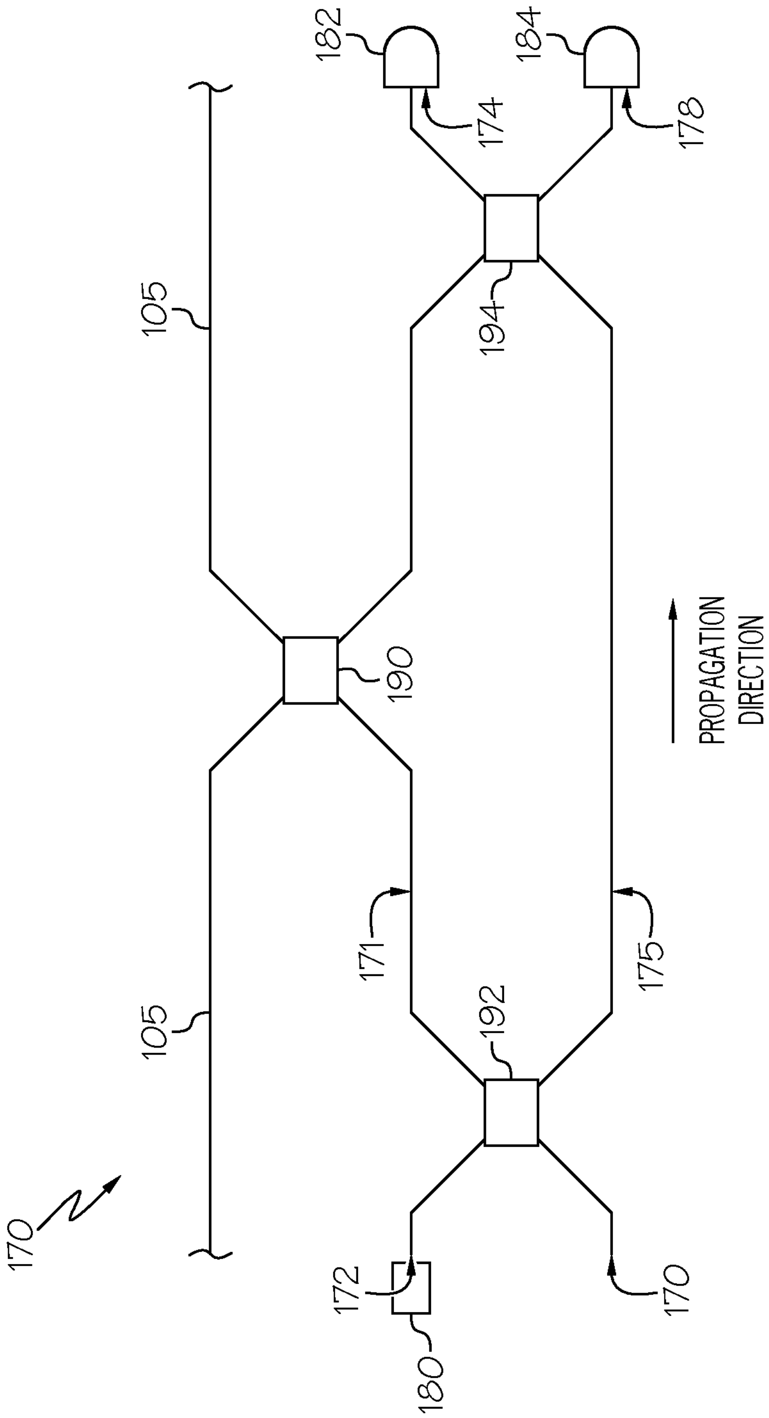
FIG. 2 schematically depicts a the nonlinear sign gate of FIG. 1 in more detail, according to one or more embodiments shown and described herein.
Figure 3:
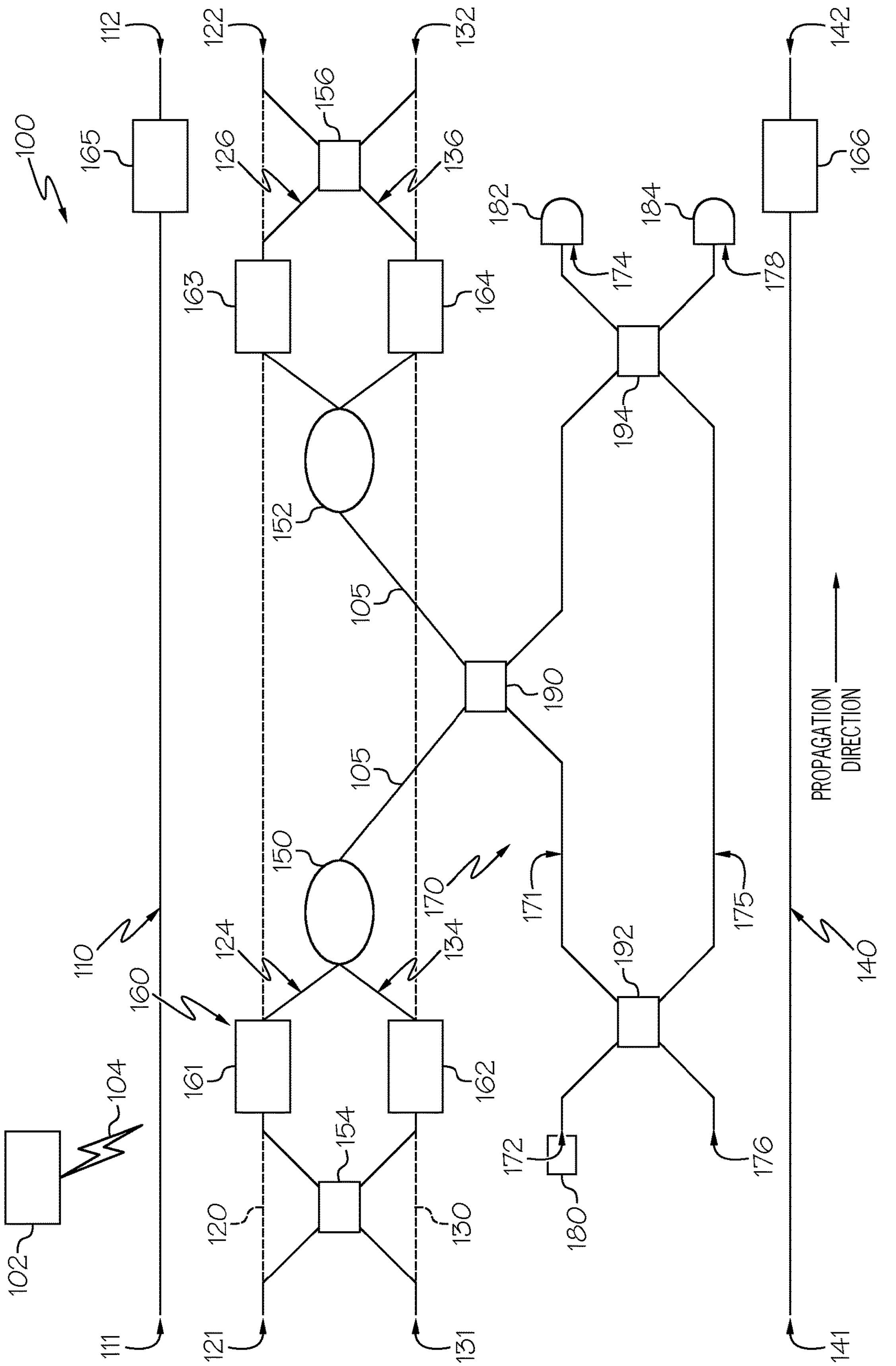
FIG. 3 schematically depicts the linear optical CZ-gate of FIG. 1 with the detailed nonlinear sign gate shown in FIG. 2, according to one or more embodiments shown and described herein.

Referring now to FIGS. 2 and 3, the nonlinear sign gate 170 is depicted in more detail. The nonlinear sign gate 170 includes a first ancilla channel 171 having a first input end 172 optically coupled to an ancilla photon source 180 and a first output end 174 optically coupled to a first photon detector 182. The nonlinear sign gate 170 also includes a second ancilla channel 175 having a second input end 176 and a second output end 178. The second output end 178 is optically coupled to a second photon detector 184. The nonlinear sign gate 170 also includes a central optical coupler 190 optically coupled to the first ancilla channel 171 and the common optical channel 105 between the ancilla photon source 180 and the first photon detector 182 In addition, a first ancilla optical coupler 192 is optically coupled to the first ancilla channel 171 and the second ancilla channel 175 between the ancilla photon source 180 and the central optical coupler 190 and a second ancilla optical coupler 194 optically coupled to the first ancilla channel 171 and the second ancilla channel 175 between the central optical coupler 190 and the second photon detector 184. The ancilla photon source 180 may comprise a single photon source, such as a quantum dot, color center, or the like. In addition, the first and second photon detectors 182, 184 comprise single photon detectors, such as a superconducting nanowire single photon detector, a carbon nanowire detector, an avalanche photodiode detector, a low dark count photodiode detector, or the like. The central optical coupler 190, first ancilla optical coupler 192, and the second ancilla optical coupler 194 may each comprise any of the optical couplers described above with respect to the first and second optical couplers 154, 156. Furthermore, each of the central optical coupler 190, first ancilla optical coupler 192, and the second ancilla optical coupler 194 comprise different coupling ratios optimized as described in E. Knill, R. Laflamme, G. Milburn, "Efficient Linear Optics Quantum Computation," arXiv:quant-ph/0006088 (2000).

In operation the nonlinear sign gate 170 performs a sign flip function on a quantum state in Fock basis (sometimes reference to as photon number space) according to equation (5), below.

$$|\Psi_{in}\rangle = \alpha|0\rangle + \beta|1\rangle + \gamma|2\rangle \rightarrow |\Psi_{out}\rangle = \alpha|0\rangle + \beta|1\rangle - \gamma|2\rangle \quad (5)$$

Referring still to FIGS. 2 and 3, performing the sign flip function on a quantum state comprises directing an ancilla photon from the ancilla photon source 180 into the first input end 172 of the first ancilla channel 171 and receiving the quantum state at the central optical coupler 190 from either the first quantum memory 161 or the second quantum memory 162. Because the release of the quantum state from the first quantum memory 161 or the second quantum memory 162 and the emission of an ancilla photon from the ancilla photon source 180 may be controlled, arrival of the quantum state and the ancilla photon at the central optical coupler 190 may be synchronized. Before reaching the central optical coupler 190, the ancilla photon traverses the first ancilla optical coupler 192. The first ancilla optical coupler 192 directs the ancilla photon into the first ancilla channel 171 or directs the ancilla photon into the second ancilla channel 175. The first ancilla optical coupler 192 comprises a reflectivity of from 0.8 to 0.9, such as 0.8, 0.81, 0.82, 0.83, 0.84, 0.85, 0.86, 0.87, 0.88, 0.89 or 0.9. When the ancilla photon is directed into the first ancilla channel 171, it may reach the central optical coupler 190 simultaneously with the quantum state released by the first the first quantum memory 161 or the second quantum memory 162. The central optical coupler 190 directs the quantum state into the first ancilla channel 171 or directs the quantum state back into the common optical channel 105. The central optical coupler 190 comprises a reflectivity of from 0.15 to 0.25, such as 0.15, 0.16, 0.14, 0.18, 0.19, 0.2, 0.21, 0.22, 0.23, 0.24 or 0.25. Similarly, when the ancilla photon reaches the central optical coupler 190, the ancilla photon is directed back into the first ancilla channel 171 or is directed into the common optical channel 105. The second ancilla optical coupler 194 also directs the ancilla photon and/or the quantum state onto the first photon detector 182 or directs the ancilla photon and/or the quantum state the first photon detector 184. The second ancilla optical coupler 194 comprises a reflectivity of from 0.8 to 0.9, such as 0.8, 0.81, 0.82, 0.83, 0.84, 0.85, 0.86, 0.87, 0.88, 0.89 or 0.9.

At this stage, the first photon detector 182 and the second photon detector 184 perform a detection to determine whether a single photon or a null state has been received by each of the first photon detector 182 or the second photon detector 184. In operation, the sign flip function is successful when a single photon is detected at the first photon detector 182 and zero photons are detected at the second photon detector, which occurs at a 1 in 4 rate. Furthermore, using the single nonlinear sign gate 170 reduces the number of single photon sources and photon detectors in the linear optical CZ-gate 100 compared to traditional linear CZ-gates. In addition, using a single nonlinear sign gate 170 provides fail-fast functionality in which operation of the linear optical CZ-gate 100 may be restarted after confirmation of a first failed sign-gate operation (e.g., failed sign flip function).

Operation of the linear optical CZ-gate 100 may be mathematically described using Equation (6), below in which α, β, γ, and δ are coefficients of an arbitrary quantum state that are modified by the linear optical CZ-gate 100.

$$\alpha|00\rangle + \beta|10\rangle + \gamma|01\rangle + \delta|11\rangle \rightarrow \alpha|00\rangle + \beta|10\rangle + \gamma|01\rangle - \delta|11\rangle \quad (6)$$

Where:

$$|00\rangle = |0\rangle_a \otimes |0\rangle_b \quad (7)$$

$$|10\rangle = |1\rangle_a \otimes |0\rangle_b \quad (8)$$

$$|01\rangle = |0\rangle_a \otimes |1\rangle_b \quad (9)$$

$$|11\rangle = |1\rangle_a \otimes |1\rangle_b \quad (10)$$

Referring now to FIGS. 1-3, a method of operating the linear optical CZ-gate 100 comprises directing the A1 quantum state into the A1 input end 111 of the A1 optical channel 110 and directing the A2 quantum state into the A2 input end 121 of the A2 optical channel 120. The A1 and A2 quantum states define the first logical qubit A and thus directing the A1 and A2 quantum states into the A1 optical channel 110 and the A2 optical channel 120 may comprise directing a single photon and/or a null state into the A1 optical channel 110 and the A2 optical channel 120. The method of operating the linear optical CZ-gate 100 also comprises directing the B1 quantum state into the B1 input end 131 of the B1 optical channel 130 and directing the B2 quantum state into the B2 input end 141 of the B2 optical channel 140. The B1 and B2 quantum states define the second logical qubit B and thus directing the B1 and B2 quantum states into the B1 optical channel 130 and the B2 optical channel 140 may comprise directing a single photon and/or a null state into the B1 optical channel 130 and the B2 optical channel 140. The linear optical CZ-gate 100 may be incorporated as part of a quantum computing system and thus, the A1-B2 quantum states may be directed into the A1-B2 input ends 111, 121, 131, 141 from another location in a quantum computing system and the photon that represent the 1-states of each logical qubit may originate at one or more photon sources.

Next, the A2 quantum state and the B1 quantum state traverse the first optical coupler 154. When the first optical coupler 154 comprises a 50:50 coupling ratio, it directs the A2 quantum state from the A2 optical channel 120 into the B1 optical channel 130 at a 1 in 2 rate and retains the A2 quantum state in the A2 optical channel 120 at a 1 in 2 rate. In addition, the first optical coupler 154 directs the B1 quantum state from the B1 optical channel 130 into the A2 optical channel 120 at a 1 in 2 rate and retains the B1 quantum state in the B1 optical channel 130 at a 1 in 2 rate. Next, the method of operating the linear optical CZ-gate 100 includes absorbing, using the first quantum memory 161, a first quantum state received by the first quantum memory 161 and absorbing, using the second quantum memory 162, a second quantum state received by the second quantum memory 162. The first quantum state may comprise the A2 quantum state of the A qubit or the B1 quantum state of the B qubit, depending where the first optical coupler 154 directs the A2 quantum state and the B1 quantum state. Next, the first quantum state is released from the first quantum memory 161 into the nonlinear sign gate 170, for example, upon receipt of a control signal from the controller 102.

Upon release, the first quantum state is directed from the first quantum memory 161 into the first optical switch 150, which is in the first position, optically coupling the A2 optical channel 120 and the common optical channel 105 such that the first quantum state reaches the nonlinear sign gate 170. At the nonlinear sign gate 170, the first quantum state undergoes a sign flip function. Performing the sign flip function on the first quantum state comprises directing an ancilla photon from the ancilla photon source 180 of the nonlinear sign gate 170 into the first input end 172 of the first ancilla channel 171 and receiving the first quantum state at the central optical coupler 190. The sign flip function is successful when a single photon is detected at the first photon detector 182 and a null state (i.e., zero photons) is detected at the second photon detector 184. After performing the sign flip function in the nonlinear sign gate 170 using the first quantum state, the method further comprises directing a first post-gate quantum state from the nonlinear sign gate 170 through the second optical switch 152, which is in a first position, and into a third quantum memory 163, where the first post-gate quantum state is absorbed. If the sign flip function is successful, which is determined using the first and second photon detectors 182, 184, the first post-gate quantum state comprises the A2 quantum state or the B1 quantum state. If the sign flip function is not successful, the operation of the linear optical CZ-gate 100 may be restarted, reducing the time spent on failed operations.

If the sign flip function is successful, the operation continues and the first optical switch 150 and the second optical switch 152 are changed from the first position to a second position such that the first B1 channel arm 134 and the second B1 channel arm 136 of the B1 optical channel 130 is optically coupled to the common optical channel 105. Next, the second quantum state is released from the second quantum memory 162 into the nonlinear sign gate 170, for example, upon receipt of a control signal from the controller 102. Upon release, the second quantum state is directed from the second quantum memory 162 into the first optical switch 150, which is in now in the second position such that the second quantum state reaches the nonlinear sign gate 170. At the nonlinear sign gate 170, the second quantum state undergoes a sign flip function. After performing the sign flip function in the nonlinear sign gate 170 using the second quantum state, the method further comprises directing a second post-gate quantum state from the nonlinear sign gate 170, through the second optical switch 152, which is in the second position, and into the fourth quantum memory 164, where the second post-gate quantum state is absorbed. If the sign flip function is successful, which is determined using the first and second photon detectors 182, 184, the second post-gate quantum state comprises the A2 quantum state or the B1 quantum state.

As described above, the linear optical CZ-gate 100 further comprises the fifth quantum memory 165 optically coupled to the A1 optical channel 110 and the sixth quantum memory 166 optically coupled to the B2 optical channel 140. Operating the linear optical CZ-gate 100 further comprises absorbing a quantum state, such as the A1 quantum state, traversing the A1 optical channel with the fifth quantum memory 165 and absorbing a quantum state, such as the B2 quantum state, traversing the B2 optical channel 140 with the sixth quantum memory 166. Absorbing quantum states using the third quantum memory 163, the fourth quantum memory 164, the fifth quantum memory 165, and the sixth quantum memory 166 allows absorbed quantum states to be released from each of the third quantum memory 163, the fourth quantum memory 164, the fifth quantum memory 165, and the sixth quantum memory 166 in a coordinated manner, such that the quantum states reach each of the A1 output end 112, the A2 output end 122, the B1 output end 132, and the B2 output end 142 simultaneously. Furthermore, before reaching the A2 output end 122 or the B1 output end 132, the quantum states released by the fourth quantum memory 164 and the fifth quantum memory 165 traverse the second optical coupler 156.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A linear optical CZ-gate comprising:
- an A1 optical channel comprising an A1 input end and an A1 output end;
- an A2 optical channel comprising an A2 input end and an A2 output end, wherein a first quantum memory is optically coupled to the A2 optical channel;
- a B1 optical channel comprising a B1 input end and a B1 output end, wherein:
  - a second quantum memory is optically coupled to the B1 optical channel; and
  - the A2 optical channel and the B1 optical channel converge at a single common optical channel downstream the first quantum memory and the second quantum memory;
- a nonlinear sign gate optically coupled to the single common optical channel; and
- a B2 optical channel comprising a B2 input end and a B2 output end.

2. The linear optical CZ-gate of claim 1, wherein the A2 optical channel and the B1 optical channel diverge from the single common optical channel downstream the nonlinear sign gate.

3. The linear optical CZ-gate of claim 1, further comprising:
- a first optical switch optically coupled to the A2 optical channel and the B1 optical channel between the first and second quantum memories and the single common optical channel; and
- a second optical switch optically coupled to the A2 optical channel and the B1 optical channel between the single common optical channel and the A2 output end and between the single common optical channel and the B1 output end.

4. The linear optical CZ-gate of claim 3, wherein:
- the A2 optical channel comprises a first A2 channel arm extending from the A2 input end to the first optical switch and a second A2 channel arm extending the from the second optical switch to the A2 output end; and
- the B1 optical channel comprises a first B1 channel arm extending from the B1 input end to the first optical switch and a second B1 channel arm extending the from the second optical switch to the B1 output end.

5. The linear optical CZ-gate of claim 1, further comprising:
- a first optical coupler optically coupled to the A2 optical channel and the B1 optical channel at a location between the A2 input end and the first quantum memory and between the B1 input end and the second quantum memory; and
- a second optical coupler optically coupled to the A2 optical channel and the B1 optical channel at a location between the nonlinear sign gate and the A2 output end and between the nonlinear sign gate and the B1 output end.

6. The linear optical CZ-gate of claim 1, further comprising:
- a third quantum memory optically coupled to the A2 optical channel between the nonlinear sign gate and the A2 output end;
- a fourth quantum memory optically coupled to the B1 optical channel between the nonlinear sign gate and the B1 output end;
- a fifth quantum memory optically coupled to the A1 optical channel between the A1 input end and the A1 output end; and
- a sixth quantum memory optically coupled to the B2 optical channel between the B2 input end and the B2 output end.

7. The linear optical CZ-gate of claim 1, wherein the first quantum memory is configured to absorb a photon representing a quantum state and release a photon comprising the quantum state of the received photon toward the nonlinear sign gate.

8. The linear optical CZ-gate of claim 1, wherein the nonlinear sign gate comprises:
- a first ancilla channel comprising a first input end optically coupled to an ancilla photon source and a first output end optically coupled to a first photon detector;
- a second ancilla channel comprising a second input end and a second output end, wherein the second output end is optically coupled to a second photon detector; and
- a central optical coupler optically coupled to the first ancilla channel and the single common optical channel between the ancilla photon source and the first photon detector.

9. The linear optical CZ-gate of claim 8, wherein the nonlinear sign gate further comprises:
- a first ancilla optical coupler optically coupled to the first ancilla channel and the second ancilla channel between the ancilla photon source and the central optical coupler; and
- a second ancilla optical coupler optically coupled to the first ancilla channel and the second ancilla channel between the central optical coupler and the second photon detector.

10. The linear optical CZ-gate of claim 8, wherein the ancilla photon source comprises a single photon source and the first photon detector and the second photon detector each comprise a single photon detector.

11. The linear optical CZ-gate of claim 1, wherein the nonlinear sign gate is the one and only one nonlinear sign gate in the linear optical CZ-gate.

12. The linear optical CZ-gate of claim 11, wherein:
- the A1 input end is configured to receive an A1 quantum state;
- the A2 input end is configured to receive an A2 quantum state, wherein the A1 and A2 quantum states define a first logical qubit;
- the B1 input end is configured to receive a B1 quantum state; and the B2 input end is configured to receive a B2 quantum state, wherein the B1 and B2 quantum states define a second logical qubit; and quantum states associated with the A1, A2, B1, and B2 quantum states are provided at the A1, A2, B1, and B2 output ends.

13. The linear optical CZ-gate of claim 1, wherein:

the A1 input end is configured to receive an A1 quantum state;

the A2 input end is configured to receive an A2 quantum state, wherein the A1 and A2 quantum states define a first logical qubit;

the B1 input end is configured to receive a B1 quantum state; and the B2 input end is configured to receive a B2 quantum state, wherein the B1 and B2 quantum states define a second logical qubit; and quantum states associated with the A1, A2, B1, and B2 quantum states are provided at the A1, A2, B1, and B2 output ends.

14. A method of operating a linear optical CZ-gate, the method comprising:

absorbing, using a first quantum memory of the linear optical CZ-gate, a first quantum state received by the first quantum memory, the linear optical CZ-gate further comprising:

an A1 optical channel comprising an A1 input end and an A1 output end;

an A2 optical channel comprising an A2 input end and an A2 output end, wherein the first quantum memory is optically coupled to the A2 optical channel;

a B1 optical channel comprising a B1 input end and a B1 output end, wherein a second quantum memory is optically coupled to the B1 optical channel, wherein the A2optical channel and the B1 optical channel converge at a single common optical channel downstream the first quantum memory and the second quantum memory;

a nonlinear sign gate optically coupled to the single common optical channel; and a B2 optical channel comprising a B2 input end and a B2 output end;

absorbing, using the second quantum memory, a second quantum state received by the second quantum memory;

releasing the first quantum state from the first quantum memory into the nonlinear sign gate;

performing a sign flip function in the nonlinear sign gate using the first quantum state;

releasing the second quantum state from the second quantum memory into the nonlinear sign gate; and performing the sign flip function in the nonlinear sign gate using the second quantum state.

15. The method of claim 14, further comprising:

directing an A1 quantum state into the A1 input end of the A1 optical channel;

directing an A2 quantum state into the A2 input end of the A2 optical channel, wherein the A1 and A2 quantum states define a first logical qubit;

directing a B1 quantum state into the B1 input end of the B1 optical channel; and directing a B2 quantum state into the B2 input end of the B2 optical channel, wherein the B1 and B2 quantum states define a second logical qubit, wherein:

a first optical coupler is optically coupled to the A2 optical channel and the B1optical channel at a location between the A2 input end and the first quantum memory and between the B1 input end and the second quantum memory;

a second optical coupler is optically coupled to the A2 optical channel and the B1optical channel at a location between the nonlinear sign gate and the A2 output end and between the nonlinear sign gate and the B1 output end;

the first quantum state is one of the A1, A2, B1, or B2 quantum states; and the second quantum state is one of the A1, A2, B1, or B2 quantum states.

16. The method of claim 15, wherein:

when the A1 quantum state comprises a single photon and the A2 quantum state comprises zero photons, the first logical qubit is in a 0-state;

when the A1 quantum state comprise zero photons and the A2 quantum state comprises a single photon, the first logical qubit is in a 1-state;

when the B1 quantum state comprise a single photon and the B2 quantum state comprises zero photons, the second logical qubit is in a 1-state; and when the B1 quantum state comprise zero photons and the B2 quantum state comprises a single photon, the second logical qubit is in a 0-state.

17. The method of claim 14, wherein performing the sign flip function on the first quantum state comprises:

directing an ancilla photon from an ancilla photon source of the nonlinear sign gate into a first input end of a first ancilla channel of the nonlinear sign gate, the nonlinear sign gate further comprising:

a first photon detector optically coupled to a first output end of the first ancilla channel;

a second ancilla channel comprising a second input end and a second output end;

a second photon detector optically coupled to the second output end;

a central optical coupler optically coupled to the first ancilla channel and the single common optical channel between the ancilla photon source and the first photon detector;

a first ancilla optical coupler optically coupled to the first ancilla channel and the second ancilla channel between the ancilla photon source and the central optical coupler; and a second ancilla optical coupler optically coupled to the first ancilla channel and the second ancilla channel between the central optical coupler and the second photon detector;

receiving the first quantum state at the central optical coupler;

detecting a single photon at the first photon detector; and detecting zero photons at the second photon detector.

18. The method of claim 14, wherein:

the first quantum state is directed from the first quantum memory into a first optical switch optically coupled to the A2 optical channel and the B1 optical channel between the first and second quantum memories and the single common optical channel;

the first optical switch is in a first position optically coupling the A2 optical channel and the single common optical channel such that the first quantum state reaches the nonlinear sign gate and undergoes the sign flip function; and the method further comprises changing the first optical switch from the first position to a second position in which the B1 optical channel is optically coupled to the single common optical channel, such that the second quantum state is directed from the second quantum memory into the first optical switch and thereafter into the nonlinear sign gate where the second quantum state undergoes the sign flip function.

19. The method of claim 18, wherein:

after performing the sign flip function in the nonlinear sign gate using the first quantum state, the method further comprises directing a first post-gate quantum state from the nonlinear sign gate, through a second optical switch that is in a first position, and into a third quantum memory, where the first post-gate quantum state is absorbed; and after performing the sign flip function in the nonlinear sign gate using the second quantum state, the method further comprises directing a second post-gate quantum state from the nonlinear sign gate, through the second optical switch that is in a second position, and into a fourth quantum memory, where the second post-gate quantum state is absorbed.

20. The method of claim 19, wherein a fifth quantum memory is optically coupled to the A1 optical channel, a sixth quantum memory is optically coupled to the B2 optical channel, and the method further comprises:

absorbing a quantum state traversing the A1 optical channel with the fifth quantum memory;

absorbing a quantum state traversing the B2 optical channel with the sixth quantum memory; and releasing quantum state from each of the third quantum memory, the fourth quantum memory, the fifth quantum memory, and the sixth quantum memory, synchronously, such that the quantum states reach each of the A1 output end, the A2 output end, the B1 output end, and the B2output end simultaneously.

21. A linear optical CZ-gate comprising:

an A1 optical channel comprising an A1 input end and an A1 output end;

an A2 optical channel comprising an A2 input end and an A2 output end, wherein;

the A2 optical channel comprises a first A2 channel arm extending from the A2 input end to a first optical switch and a second A2 channel arm extending the from a second optical switch to the A2 output end; and a first quantum memory is optically coupled to the first A2 channel arm;

a B1 optical channel comprising a B1 input end and a B1 output end, wherein:

the B1 optical channel comprises a first B1 channel arm extending from the B1 input end to the first optical switch and a second B1 channel arm extending the from the second optical switch to the B1 output end;

a second quantum memory is optically coupled to the first B1 channel arm; and a first optical coupler optically coupled to the first A2 channel arm and the first B1 channel arm upstream the first and second quantum memories;

a common optical channel extending from the first optical switch to the second optical switch;

a nonlinear sign gate optically coupled to the common optical channel; and a B2 optical channel comprising a B2 input end and a B2 output end.

22. The linear optical CZ-gate of claim 21, further comprising:

a third quantum memory optically coupled to the A2 optical channel between the nonlinear sign gate and the A2 output end;

a fourth quantum memory optically coupled to the B1 optical channel between the nonlinear sign gate and the B1 output end;

a fifth quantum memory optically coupled to the A1 optical channel between the A1 input end and the A1 output end; and a sixth quantum memory optically coupled to the B2 optical channel between the B2 input end and the B2 output end.

* * * * *